United States Patent
Ruppert

(10) Patent No.: US 11,682,984 B2
(45) Date of Patent: Jun. 20, 2023

(54) CONVERTER, MOTOR VEHICLE AND METHOD FOR CONTROLLING A HALF BRIDGE CIRCUIT

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/551,239

(22) Filed: Dec. 15, 2021

(65) Prior Publication Data

US 2022/0286023 A1    Sep. 8, 2022

(30) Foreign Application Priority Data

Mar. 4, 2021   (DE) .......................... 102021105185.1

(51) Int. Cl.
*H02M 7/5387*   (2007.01)
*H02M 7/00*     (2006.01)

(52) U.S. Cl.
CPC ....... *H02M 7/53871* (2013.01); *H02M 7/003* (2013.01)

(58) Field of Classification Search
CPC . H02M 7/5387; H02M 7/53871; H02M 7/003
See application file for complete search history.

(56) References Cited

U.S. PATENT DOCUMENTS

2014/0055173 A1\* 2/2014 Shiraishi ................ H03K 17/56
257/77

FOREIGN PATENT DOCUMENTS

| CN | 110034686 A    | 7/2019 |
|----|----------------|--------|
| DE | 102016220118 A1| 4/2018 |
| DE | 102018110808 A1| 5/2019 |
| JP | 2017195680 A   | 10/2017|
| JP | 202061810 A    | 4/2020 |
| JP | 202078239 A    | 5/2020 |
| JP | 2020078239 A \*| 5/2020 |

OTHER PUBLICATIONS

German Search Report dated Oct. 21, 2021 in corresponding German Application No. 102021105185.1, 14 pages; Machine translation attached.

\* cited by examiner

*Primary Examiner* — Jue Zhang
(74) *Attorney, Agent, or Firm* — Maier & Maier, PLLC

(57) ABSTRACT

A converter with a half bridge circuit with at least one active half bridge branch, of which the phase connection in each case is connected via a respective switching device to a respective reference potential. A control device of the converter is configured to alternatingly conductively and non-conductively switch the respective switching device. The first and second switching device in each case includes a parallel connection of at least one transistor of a first type and at least one transistor of a second type.

10 Claims, 3 Drawing Sheets

CONVERTER, MOTOR VEHICLE AND METHOD FOR CONTROLLING A HALF BRIDGE CIRCUIT

FIELD

The invention relates to a converter with a half bridge circuit with at least one half bridge branch, the phase connection of which in each case is connected via a respective switching device to a respective reference potential, wherein a control device of the converter is configured to alternatingly conductively and non-conductively switch the respective switching device, wherein the first and the second switching device in each case includes a parallel connection of at least one transistor of a first type and of at least one transistor of a second type. In addition, the invention relates to a motor vehicle and to a method for controlling a half bridge circuit.

BACKGROUND

Electric vehicles use converters, namely inverters, to supply a drive motor from a direct current on-board power supply. Such a converter can be produced, for example, as module, in that, on three substrates, in each case an active half bridge branch is provided, whereafter the substrates are attached on a housing which, for example, in addition includes an intermediate circuit capacitor and a control device. The half bridge branches usually use silicon IGBTs as semiconductor switch. However, such converters have relatively high losses during partial-load operation, since, in the case of conductively switched silicon IGBTs, a relatively large voltage drop on the transistor occurs already with low current flows.

One possibility for avoiding this would be to use another transistor technology instead of silicon IGBTs. For example, by using silicon carbide MOSFETs as semiconductor switches, the losses during partial-load operation can be reduced. However, here it is disadvantageous that, on these transistors, in the case of high currents and thus a full-load or boost operation of the drive motor, relatively high losses occur.

One possible approach to efficiency optimization of the vehicle is to provide separate drives for the front and rear axles of the motor vehicle and to use separate inverters with different semiconductor technologies for them. However, implementation of two separate inverter modules in the vehicle increases the technical effort, the costs and the use of installation space and is thus rather disadvantageous in particular for low-priced vehicles or smaller vehicles with lower driving power.

A converter which combines different transistor types is known from published document DE 10 2018 110 808 A1. There, for connecting a respective phase connection to the reference potentials, transistors with band gaps of different sizes are used.

Published document CN 110034686 A uses, in a direct current converter, half bridges which use a parallel connection of silicon carbide MOSFETs and silicon IGBTs. Here, the MOSFET is conductively switched before the IGBT and non-conductively switched after the IGBT, so that switching processes of the IGBT essentially occur without a voltage drop on the IGBT. By suitable dimensioning of the transistors, low switching losses can here be achieved in a certain load range.

SUMMARY

The underlying aim of the invention therefore is to further reduce losses on converters, in particular on converters of a drive motor of a motor vehicle, wherein, in particular, an efficiency improvement at low and at high loads is to be achieved.

The aim is achieved according to the invention by a converter of the type mentioned at the start, wherein the control device is configured,
  on the one hand, if a first selection condition is met, to conductively switch transistors of the first type exclusively, in order to conductively switch the respective switching device, and/or,
  on the other hand, if a second selection condition is met, not to conductively switch transistors of the first type, which are MOSFETs and/or use silicon carbide as semiconductor material, or to conductively switch said transistors exclusively during a subinterval of a respective time interval, in which the transistor of the second type of the same switching device is conductively switched, in order to conductively switch the respective switching device.

Converters for motors, in particular for drive motors in the motor vehicle, must provide clearly different current intensities at different times. This results, on the one hand, from the at least approximately sinusoidal current feed of the phases of the motor and, on the other hand, from the fact that, depending on the power demand, or respectively depending on the torque demand, alternating current with clearly different amplitude is to be fed to the motor. In the context of the invention, it has been recognized that losses in the converter or in the respective half bridge branch can be reduced in that, a conductive switching of the respective switching device occurs differently in different operating states.

As will be explained even more precisely later, the first selection condition can be met in particular for low loads or provided currents, and the second selection condition can be met for high loads or provided currents. For example, if silicon carbide MOSFETs are combined with silicon IGBTs to form a switching device, it can be advantageous, for providing low phase currents, to conductively switch exclusively the silicon MOSFETs, while, for providing high phase currents, exclusively the silicon IGBTs can be conductively switched, or alternatively the silicon IGBTs can be conductively switched before the silicon carbide MOSFETs and non-conductively switched after them.

This subinterval includes the entire time interval and is temporally separated in particular both from the beginning and also from the end of the time interval. In other words, the exclusive conductive switching of transistors of the first type within the subinterval means that they are conductively switched after the transistors of the second type and are non-conductively switched before them.

A conductive or non-conductive switching of the transistors is understood to mean respective switching states which, during operation of the transistor as semiconductor switch, correspond to a closed switch and respectively to an open switch. Although, here, for example, for MOSFETs, in the non-conductive state there can also be a conductivity due to the intrinsic diode, it does not prevent potential equalization between the phase output and the respective reference potential, as long as the potential at the phase output is between the reference potential and therefore typically relevant only during freewheeling or in a commutation phase.

Typically, an alternating current is provided at the phase output. The operation of active half bridge branches is in fact known in itself and will not be explained in detail. For the provision of sinusoidal voltage curves, in particular within a respective half-wave, a conductive and non-conductive switching of the same switching device can occur in relatively rapid succession, wherein the pulse width of the conductive switching can be varied in order to provide a sinusoidal voltage curve. The described selection of the transistor type to be actuated or of the sequence of the actuation of the transport types can occur at the time of each conductive switching of the respective switching device, wherein, in particular at different times within the respective half-wave, different selection conditions can also be met, in particular since different current intensities are provided.

The transistors of the first type can be MOSFETs and/or they can use silicon carbide as semiconductor material and/or the transistors of the second type can be IGBTs and/or they can use silicon as semiconductor material. The term MOSFET refers to a metal oxide semiconductor field-effect transistor. Preferably, a silicon carbide MOSFET is used as first type. The term IGBT refers to a bipolar transistor with insulating gate electrode. In particular, silicon IGBTs are used as transistors of the second type.

Meeting the first and/or second selection condition(s) can depend on the determined or specified or predicted current intensity through the phase connection. In the simplest case, a phase current can be measured, wherein this measurement can occur within the converter itself, on a consumer side or at a connection line. However, it is also possible that the converter is actuated in such a manner that, in a targeted manner, certain current intensities are provided, whereby the current intensity is directly specified. Predicting the current intensity is possible in particular if information on the consumer, for example, a motor model, or at least information on the inductance of the coils there is known. Corresponding approaches for determining the current intensity through the phase connection are known per se and will therefore not be explained in detail. As explained at the start, it has been recognized that, at different current intensities through the phase connection, different actuation approaches for the different transport types are appropriate in order to achieve an optimal efficiency of the converter.

The first selection condition can be met or can only be met if the magnitude of the current intensity is less than a specified first limit value. As explained at the start, if low currents are to be provided, it can be particularly advantageous to conductively switch silicon carbide MOSFETs exclusively. Additionally or alternatively, the second selection condition can be met or can only be met if the magnitude of the current intensity reaches or exceeds the first limit value or a specified second limit value. As already mentioned above, the actuation strategy explained for the second selection condition is particularly appropriate for high current intensities.

In the simplest case, the first limit value is used for both selection conditions, so that, depending on the current intensity, in particular the first or second selection condition can always be met. A corresponding actuation can be implemented with low technical effort and it already achieves a good efficiency. In particular, in this case, when the second selection condition is met, exclusively the transistor of the first type is conductively switched exclusively, in order to conductively switch the respective switching device. However, as explained below, between the first limit value and a second limit value, that is to say for output currents of medium magnitude, it can be advantageous to select an additional actuation strategy in order to further improve the efficiency.

The control device can be configured so that, when a third selection condition is met, which is met or can be met only if the magnitude of the current intensity reaches or exceeds the first limit value and is less than the second limit value, transistors of the second type are conductively switched exclusively during a subinterval of a respective time interval, in which the transistor of the first type of the same switching device is conductively switched. The subinterval is shorter than the time interval and temporally spaced particularly from the beginning and end of the time interval.

In particular, the use of the third selection condition can be combined with the design in which, when the second selection condition is met, transistors of the first type are conductively switched exclusively during a subinterval of a respective time interval, in which the transistor of the second type of the same switching device is conductively switched. In the end, this means that both when the second selection condition is met and also when the third selection condition is met and thus in particular with medium and high currents, for conductively switching the switching device, both transistor types are conductively switched, wherein different switching sequences are used during the time interval for which the switching device is conductively switched.

The phase connection can be connected exclusively via the transistors of the first and of the second type to the respective reference potential. In particular, between the phase connection and the respective reference potential, no separate freewheeling diode can be connected. The freewheeling or the current flow in the commutation phase can be implemented or occur via an intrinsic diode, in particular of the first transistor type, that is to say, for example, of a silicon carbide MOSFET. Thereby, the technical effort for implementing the converter according to the invention is further reduced.

For at least one of the switching devices, at least one respective transistor, in particular in each case multiple parallel-connected transistors of both the first and the second type can be arranged on a common substrate. Additionally or alternatively, all the transistors of the half bridge branch or of at least one of the half bridge branches can be arranged on a common substrate. In particular, as many transistors of the first type as of the second type can be used. The use of the common substrate can further reduce the technical complexity of the converter and thus the effort for its production. For example, a three-phase converter can then be constructed by mounting three of these substrates, each carrying transistors of a semiconductor branch, on a common carrier or housing.

For at least one of the switching devices, at least one respective transistor, in particular in each case multiple parallel-connected transistors of both the first and of the second type can be contacted by a common conductive contact surface. By using a common contact surface having a particularly large surface area, the heat dissipation can be improved. The described contacting is achieved, for example, by the "direct bonded copper" connection technique, using a common large-surface copper electrode.

In particular, the converter according to the invention can be a three-phase converter including three half bridge branches connected between the reference potentials.

Besides the converter according to the invention, the invention relates to a motor vehicle with a motor, in particular a drive motor, wherein the motor vehicle includes a converter according to the invention used for feeding current to the motor. As already explained, in particular for the current feed of drive motors in motor vehicles, clearly different phase currents are necessary at different times, whereby the design of the converter according to the invention can here achieve particularly high gains in efficiency.

In addition, the invention relates to a method for controlling a half bridge circuit with at least one active half bridge branch, the phase connection of which in each case is connected via a respective switching device to a respective reference potential, wherein the switching devices in each case are alternatingly conductively and non-conductively switched, wherein the first and second switching devices each include a parallel connection of at least one transistor of a first type and at least one transistor of a second type, wherein, on the one hand, if a first selection condition is met, exclusively transistors of the first type are conductively switched, in order to conductively switch the respective switching device, and/or, on the other hand, if a second selection condition is met, transistors of the first type, which are MOSFETs and/or which use silicon carbide as semiconductor material, are not conductively switched or are conductively switched exclusively during a subinterval of a respective time interval, in which the transistor of the second type of the same switching device is conductively switched, in order to conductively switch the respective switching device.

The advantages of this actuation method have already been explained in reference to the converter according to the invention. The method can be used in particular for controlling a half bridge circuit in the converter according to the invention. Independently thereof, the features relating to the actuation of a half bridge circuit which have been explained with regard to the converter according to the invention can be transferred along with the advantages mentioned there to the method according to the invention, and features explained with regard to the method according to the invention can be transferred to the converter according to the invention. In particular, in the method according to the invention, meeting the first and/or the second selection condition can also depend on a determined or specified or predicted current intensity through the phase connection, in particular, as explained with regard to the converter according to the invention, and/or the third selection condition explained with regard to the converter according to the invention can be used.

BRIEF DESCRIPTION OF THE FIGURES

Additional advantages and details of the invention result from the embodiment examples described below as well as from the associated drawings. Here, diagrammatically.

DETAILED DESCRIPTION

Figure 1:
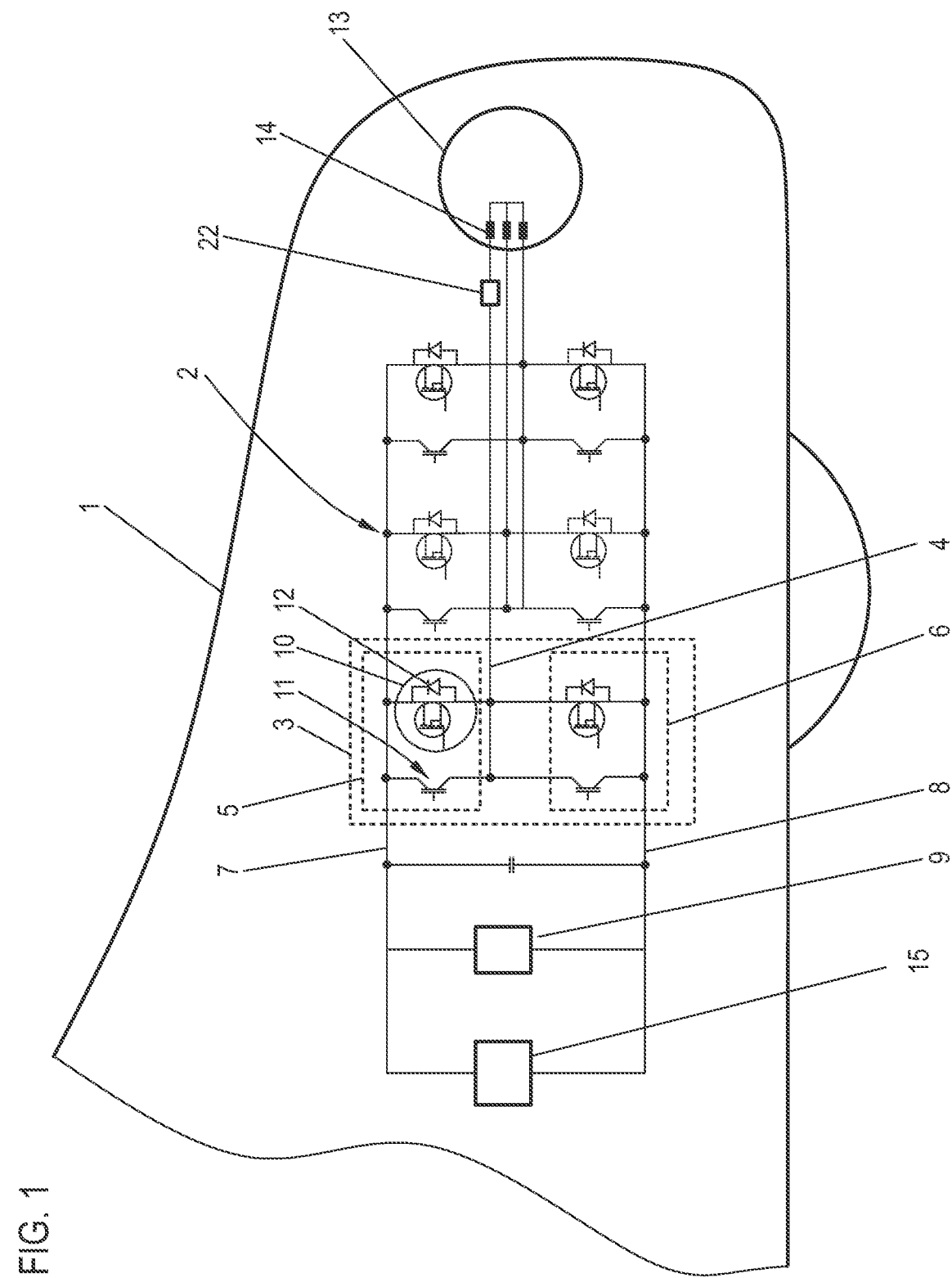
FIG. 1 shows an embodiment example of a motor vehicle according to the invention which includes an embodiment example of a converter according to the invention, the half bridge circuits of which are controlled in accordance with an embodiment example of the method according to the invention.

FIG. 1 shows a motor vehicle 1, of which the motor 13 or the coils 14 are fed current by a converter 2. The converter is supplied with direct current, for example, by a battery 15, from the on-board power supply of the motor vehicle, and provides a three-phase alternating current for the operation of the motor 13.

For the provision of the three-phase alternating current, three half bridges 3 are used, of which the respective phase connection 4 on which the alternating current for the respective phase is provided is connected via a respective switching device 5, 6 to the reference potentials 7, 8. A control device 9 which controls the operation of the switching devices 5, 6, in order to provide the alternating current, is also fed current by the battery 15 in the example. In an actual implementation, it can be advantageous under some circumstances to supply the control device 9 by a low-voltage on-board power supply and to supply the converter 2 via the reference potentials 7, 8 from a high-voltage power-supply system of the motor vehicle 1.

The switching devices 5, 6 are intermittently actuated by the control device 9, as is known from the prior art, in order to provide a sinusoidal voltage or current curve at the respective phase connection 4, wherein, due to the approximately purely inductive load of the motor 13, a phase offset of approximately 90° between current and voltage results. The voltage at the phase connection 4 can be adjusted by intermittent conductive switching of the switching device 5 to the reference potential 7 and vice versa by intermittent conductive switching of the switching device 6 to the reference potential 8. Depending on the effective phase of the alternating current, the times for which the respective switching device 5, 6 is conductively switched are adapted in order to achieve an approximately sinusoidal voltage curve. In addition, by scaling the time for which the respective switching device 5, 6 is conductively switched, an amplitude of the voltage curve and thus also of the resulting current curve can be set. This procedure for feeding current to a motor by a converter is known per se, wherein typically silicon IGBTs are used as switching devices 5, 6.

Instead, the switching devices 5, 6 in the inverter 2 in each case are formed by a parallel connection of at least one transistor 10 of a first type, in the example, of a silicon carbide MOSFET, and at least one transistor 11 of a second type, in the example, of a silicon IGBT. For reasons of clarity, in FIG. 1, for the respective switching device 5, 6, only one of the transistors 10, 11 is represented in each case. Typically, multiple identical transistors 10, 11 are parallel-connected in each case in order to be able to provide higher powers.

While, in conventional switching devices 5, 6 which use semiconductor switches, an additional freewheeling diode is necessary, in the present case this is not necessary, since the silicon carbide MOSFET already comprises an intrinsic diode 12. Thereby, in spite of the necessary parallel connection of transistors 10, 11 of different types, the technical effort for implementing the circuit shown can be kept relatively low.

The control device 9 actuates the transistors 10, 11 of different types separately, so that it is possible, for example, by control technology, to conductively switch the transistor 11 exclusively, to conductively switch the transistor 10 exclusively, or to conductively switch both transistors, in order to conductively switch the switching device 5, 6 as a whole. Here, it has been recognized that losses in the converter 2 can be reduced if at least one parameter of the converter 2 is evaluated and different actuation patterns for the transistors 10, 11 are used depending on these parameters, in order to conductively switch the respective switching device 5, 6. The following examples here discuss a dependency of the switching behavior on the current provided at the phase connection 4. Alternatively or additionally, for example, a temperature of the converter 2 or of individual components of the converter 2 could also be taken into consideration.

Figure 2:
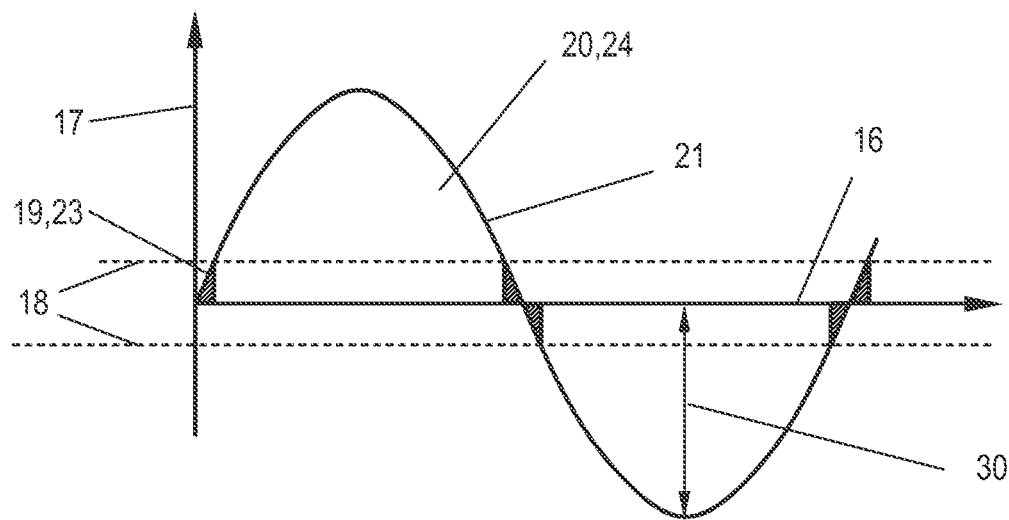
FIG. 2 shows an example for actuation strategies for the transistor types, FIG. 3 also shows an example for actuation strategies for transistor types

A first possible operating strategy of the converter 2 is diagrammatically shown in FIG. 2. Here, the x axis 16 shows the time course, and, on they axis 17, a current intensity 21 at the phase connection 4 of the respective half bridge branch 3 is represented. As already explained above, the curve of the current intensity 21 with respect to time is at least approximately sinusoidal.

The respective switching device 5, 6 which is to be conductively switched is actuated in such a manner that if a first selection condition 23 is met, exclusively the transistors 10 of the first type are conductively switched, in order to conductively switch the respective switching device 5, 6. On the other hand, if a second selection condition 24 is met, exclusively the transistors 11 of the second type are conductively switched, in order to conductively switch the respective switching device 5, 6. Here, the first selection condition is met if the magnitude of the current intensity 21 is less than a specified limit value 18. On the other hand, if the magnitude of the current intensity 21 is greater than the limit value 18, then the second selection condition 24 is met instead.

This leads to the fact that, in the shaded areas 19 in FIG. 2, that is to say in the case of low current intensities, exclusively the transistors 10, that is to say, in the example, silicon carbide MOSFETs, are switched. This is advantageous since, in silicon carbide MOSFETs, at low currents, smaller losses occur than when silicon IGBTs are used. However, since, at higher currents, by using silicon IGBTs for conductively switching the switching device 5, 6, lower losses can be achieved than when silicon carbide MOSFETs are used, in the non-shaded areas 20 in FIG. 2, in which high current intensities 21 occur, exclusively transistors 11 of the second type are conductively switched, in order to conductively switch the respective switching device 5, 6.

The described operating strategy is technically relatively easy to implement, since such a limit value comparison can be implemented, for example, directly by a comparator. The current intensity 21 can be acquired, for example, via a current sensor 22. However, alternatively, it would also be possible to determine said current intensity directly from the actuation information for the converter 2, for example to predict it with the aid of known parameters of the motor 13, in particular the inductance of the coils 14.

Since the meeting of the selection conditions 23, 24 is dependent on the instantaneous current intensity 21, for example, a reduction of the amplitude 30 of the alternating current fed to the coil 14 automatically leads to the first selection condition 23 being met for a longer time and to the second selection condition 24 being met for a shorter time, since the current amplitude 21 remains below the limit value 18 for a larger part of the operating time.

Figure 3:
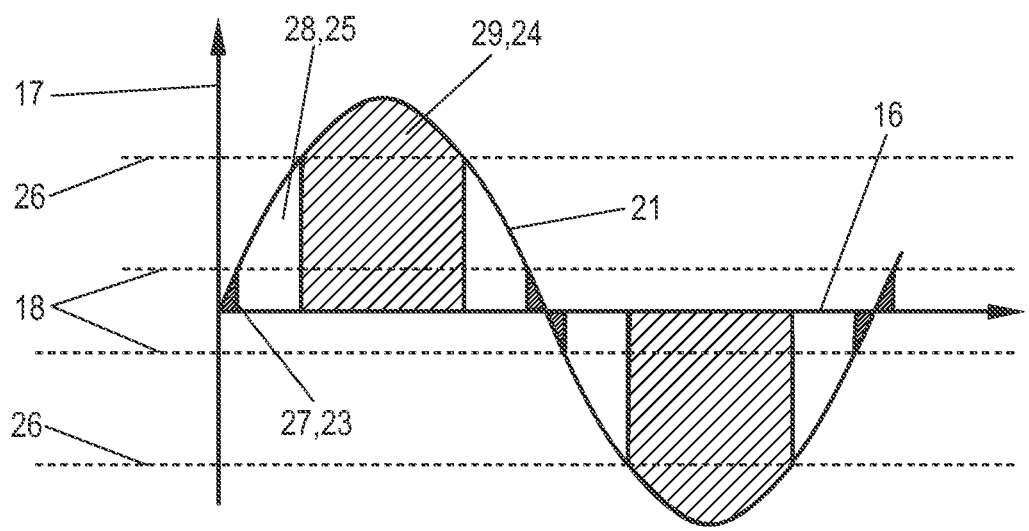

In FIG. 3, the same curve of the current intensity 21 as in FIG. 2 is represented, wherein in FIG. 3, another operating strategy for the converter 2 is used, which, however, although its implementation is technically slightly more complex, enables a further increase in efficiency.

Here, the actuation of the transistors 10, 11 occurs as long as the magnitude of the current intensity 21 does not reach the limit value 18, and thus the first selection condition 23 is met, exactly as was the case in the operating strategy according to FIG. 2. Thus, in the smaller shaded areas 27, as was the case in FIG. 2 in the shaded areas 19, exclusively the transistors 10 of the first type are conductively switched, in order to conductively switch the respective switching devices 5, 6.

However, if the limit value 18 is exceeded by the magnitude of the current intensity 21, in principle, transistors 10, 11 of the both types are conductively switched when the respective switching device 5, 6 is conductively switched. However, here, different time sequences of the actuation are used.

In the operating strategy shown in FIG. 3, the second selection condition 24 is met only if a second limit value 26 is exceeded by the magnitude of the current magnitude 21, as in the large shaded area 29. During operation in this area 29, in order to conductively switch the respective switching device 5, 6, the transistor 11 of the second type, that is to say, in the example, the silicon IGBT, is always conductively switched, and the transistor 10 is conductively switched only after a brief delay of, for example, a few nanoseconds. The switchover into the non-conductive state occurs in reverse order, that is to say, first the transistor 10 of the first type is non-conductively switched, and subsequently, after a brief delay, the transistor 11 of the second type is non-conductively switched. It has been recognized that this switching behavior is advantageous for providing high currents, that is to say, in particular, when there are high loads on the converter 2.

In the non-shaded areas 28 in FIG. 3, the magnitude of the current intensity 21 is between the limit values 18 and 26, so that a third selection condition 25 is met. In these areas 28, during the conductive switching of the respective switching devices 5, 6, first the transistor 10 of the first type is conductively switched, and subsequently, after a short delay, the transistor 11 of the second type is conductively switched. The non-conductive switching occurs in reverse order, so that first the transistor 11 of the second type is non-conductively switched, and subsequently the transistor 10 of the first type is non-conductively switched. This switching behavior leads to the transistor of the second type 11, that is to say the silicon IGBT, being nearly voltage-free during its switching processes. Thereby, switching losses can be reduced, which can dominate the power loss at medium current intensities, whereby the switching behavior is optimal at medium current intensities.

Figure 4:
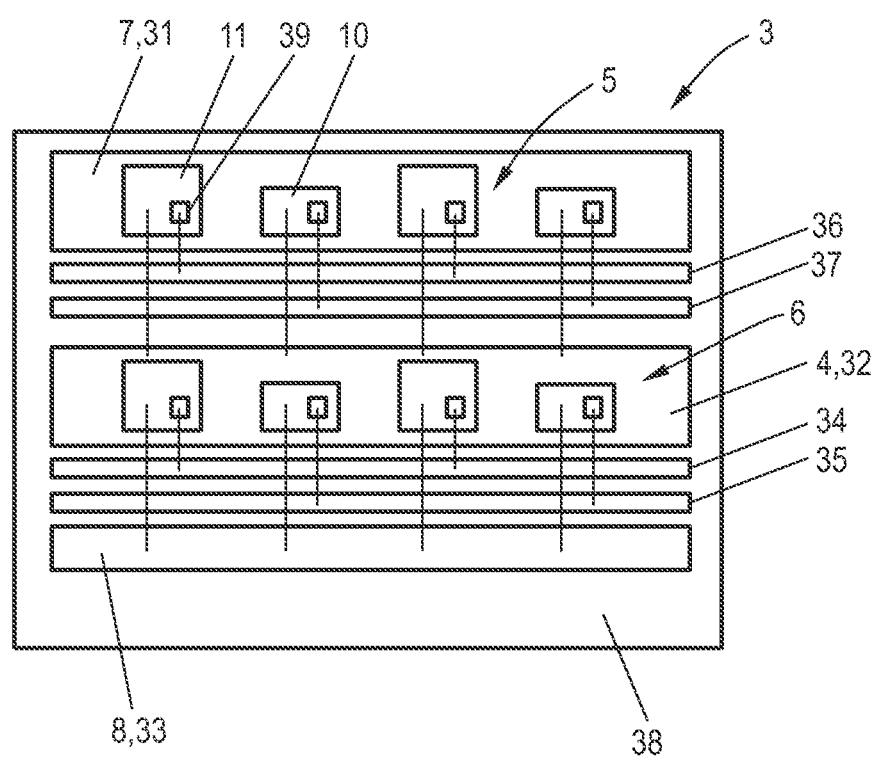
FIG. 4 shows a half bridge module of an embodiment example of a converter according to the invention, which implements a half bridge branch.

FIG. 4 diagrammatically shows the design of one of the half bridge branches 3 as semiconductor module. Three of these semiconductor modules can be attached, for example, to a common holder or to a common housing, in order to provide a converter module.

A common substrate 38 carries all the transistors 10, 11 of the half bridge branch 3 and thus transistors 10, 11 of different types. The transistors 10, 11 of the switching device 5 are contacted by a common conductive contact surface 31 which, during the operation of the converter 2, is at the reference potential 7. The corresponding transistors of the switching device 6 are also arranged on a common conductive contact surface 32 which, during the operation of the converter 2, is at the potential of the phase connection 4.

Both in the first and in the second switching device 5, 6, in the example shown in FIG. 4, in each case two transistors 10 of the first type and two transistors 11 of the second type are parallel-connected. For scaling the power of the semiconductor branch 3, more or fewer transistors 10, 11 of the same type can also be parallel-connected.

By using a large-surface common contact surface 31, 32 for the transistors 10, 11 of the respective switching device 5, 6, these contact surfaces 31, 32 can also be satisfactorily used for the heat dissipation. The contact surfaces 31, 32 can in particular be copper surfaces, and a "direct copper bonded" structure can be produced.

The substrate 38, in addition, carries an additional conductive contact surface 33 for providing the reference potential 8 as well as contact surfaces 34 to 37 in order to provide gate voltages for respective gate connections 39 of the transistors 10, 11, wherein, for the different types of the transistors 10, 11, in each case separate contact surfaces 34-37 are provided, in order to enable a separate actuation of the types.

The invention claimed is:

1. A converter, comprising:
a half bridge circuit with at least one active half bridge branch, of which a phase connection in each case is connected via a respective switching device to a respective reference potential,
wherein a control device of the converter is configured to alternatingly switch the respective switching device between conducting and non-conducting states,
wherein a first and second switching device in each case comprises a parallel connection of at least one transistor of a first type and at least one transistor of a second type,
wherein the control device is configured such that:
when a first selection condition is met, whereby a first limit value is not exceeded, the at least one transistor of the first type is conductively switched and the at least one transistor of the second type remains in the non-conducting state;
when a second selection condition is met, whereby the first limit value and a second limit value are both exceeded, the at least one transistor of the first type is conductively switched with delay relative to conductive switching of the at least one transistor of the second type, and the at least one transistor of the second type is non-conductively switched with delay relative to non-conductive switching of the at least one transistor of the first type; and
when a third selection condition is met, whereby the first limit value is exceeded and the second limit value is not exceeded, the at least one transistor of the second type is conductively switched with delay relative to conductive switching of the at least one transistor of the first type, and the at least one transistor of the first type is non-conductively switched with delay relative to non-conductive switching of the at least one transistor of the second type.

2. The converter according to claim 1, wherein the at least one transistor of the first type are MOSFETs and comprise silicon carbide, and the at least one transistor of the second type are IGBTs and comprise silicon.

3. The converter according to claim 1, wherein the first and second limit values define a current intensity which is compared against a measured current intensity through the phase connection.

4. The converter according to claim 1, wherein the first and second limit values define a current intensity which is compared against a predicted current intensity through the phase connection.

5. The converter according to claim 4, wherein the predicted current intensity is determined based on at least a motor coil inductance.

6. The converter according claim 1, wherein the phase connection is connected exclusively via the transistors of the first and second type to the respective reference potential.

7. The converter according to claim 1, wherein for at least one of the switching devices, the parallel connection of transistors is arranged on a common substrate.

8. The converter according to claim 1, wherein for at least one of the switching devices, the parallel connection of transistors are contacted by a common conductive contact surface.

9. A motor vehicle comprising a drive motor fed current by the converter according to claim 1.

10. A method for controlling a half bridge circuit with at least one active half bridge branch, a phase connection of which in each case is connected via a respective switching device to a respective reference potential, wherein the respective switching devices are alternatingly switched between conducting and non-conducting states, wherein a first and second switching device in each case comprises a parallel connection of at least one transistor of a first type and at least one transistor of a second type, the method comprising:
when a first selection condition is met, whereby a first limit value is not exceeded, conductively switching the at least one transistor of the first type and maintaining the at least one transistor of the second type in the non-conducting state;
when a second selection condition is met, whereby the first limit value and a second limit value are both exceeded, conductively switching the at least one transistor of the first type with delay relative to conductive switching of the at least one transistor of the second type, and non-conductively switching the at least one transistor of the second type with delay relative to non-conductive switching of the at least one transistor of the first type; and
when a third selection condition is met, whereby the first limit value is exceeded and the second limit value is not exceeded, conductively switching the at least one transistor of the second type with delay relative to conductive switching of the at least one transistor of the first type, and non-conductively switching the at least one transistor of the first type with delay relative to non-conductive switching of the at least one transistor of the second type.

* * * * *